United States Patent [19]
Strasser et al.

[11] Patent Number: 5,850,302
[45] Date of Patent: Dec. 15, 1998

[54] ARTICLE COMPRISING AN OPTICAL WAVEGUIDE TAP

[75] Inventors: Thomas A. Strasser, Warren, N.J.; Jefferson Lynn Wagener, Charlottesville, Va.

[73] Assignee: Lucent Technologies Inc., Murray Hill, N.J.

[21] Appl. No.: 978,352

[22] Filed: Nov. 25, 1997

Related U.S. Application Data

[62] Division of Ser. No. 741,439, Oct. 31, 1996.
[51] Int. Cl.$^6$ ............................................. H04J 14/02
[52] U.S. Cl. ............................ 359/127; 359/130; 359/177
[58] Field of Search ................................. 359/124, 125, 359/127, 130, 110, 161, 173, 177, 179; 385/24, 37

[56] References Cited

U.S. PATENT DOCUMENTS

| | | | |
|---|---|---|---|
| 5,061,032 | 10/1991 | Meltz et al. | 385/37 |
| 5,218,655 | 6/1993 | Mizrahi | 385/39 |
| 5,225,922 | 7/1993 | Chraplyvy et al. | 359/124 |
| 5,315,436 | 5/1994 | Lowenhar et al. | 359/130 |
| 5,532,864 | 7/1996 | Alexander et al. | 359/177 |
| 5,689,594 | 11/1997 | Mao | 385/24 |
| 5,696,615 | 12/1997 | Alexander et al. | 359/134 |

OTHER PUBLICATIONS

"Tilted Fiber Phase Gratings", by T. Erodgan et al., *J. Opt. Soc. Am. A*, vol. 13, No. 2, Feb. 1996, pp. 296–313.

*Primary Examiner*—Rafael Bacares
*Attorney, Agent, or Firm*—Eugen E. Pacher

[57] ABSTRACT

A dispersive optical waveguide tap comprises a blazed and chirped refractive index grating in the core of the waveguide, coupling means and utilization means. The grating is selected such that guided mode light of predetermined wavelength will, in the absence of the coupling means, be directed into one or more cladding modes of the waveguide. The presence of the coupling means in optical co-operation with the waveguide, changes the guiding conditions such that the cladding modes are substantially eliminated from a portion of the waveguide that includes the cladding, whereby the grating directs the guided mode light into one or more radiation modes. The blaze angle typically is $\leq 15°$. The chirp serves to bring the radiation mode light substantially to a focus in at least one dimension, the focal point (or line) depending on the wavelength of the light. The utilization means exemplarily comprise an array of photodetectors, and the coupling means exemplarily comprise an appropriately shaped glass member and index matching means. Dispersive waveguide taps are advantageously used in WDM optical communication systems, e.g., to provide status information (e.g., channel wavelength, channel power, including presence or absence of a channel) to, e.g., a system maintenance unit. The status information facilitates maintenance of operating conditions by conventional feedback control.

3 Claims, 5 Drawing Sheets

ARTICLE COMPRISING AN OPTICAL WAVEGUIDE TAP

This is a continuation division of application Ser. No. 08/741,439 filed Oct. 31, 1996 allowed.

FIELD OF THE INVENTION

This invention pertains to wavelength-selective means for coupling light from an optical fiber, and to articles (e.g., an optical amplifier) or systems (e.g., an optical fiber communication system; collectively "articles") that comprise such means.

BACKGROUND

In multi-wavelength optical fiber communication systems (usually referred to as "wavelength division multiplexed" or "WDM" systems), efficient wavelength-selective means for tapping electromagnetic radiation (to be referred to herein as "light", regardless of wavelength) from the optical fiber could be advantageously used in a variety of functions, e.g., as a wavelength monitor, channel monitor, demultiplexer, amplifier monitor, or in a feedback loop with an optical amplifier.

U.S. Pat. No. 5,061,032 to G. Meltz et al. discloses an optical fiber tap that comprises a blazed, chirped refractive index grating selected to redirect light guided in the fiber such that it comes to a focus at a point outside of the fiber. The patent also discloses that ". . . the angle of the external path that results in the constructive interference is peculiar to the respective central wavelength $\lambda$.".

The tap of the '032 patent has some shortcomings. For instance, due to the relatively large (exemplarily $\geq 22°$) blaze angle that is required to achieve the desired redirection of the light guided in the fiber core to light in space outside of the fiber, the arrangement is subject to undesirable polarization effects, i.e., the fraction of light that is redirected by the grating depends on the polarization of the incident guided light. Whereas for low blaze angles ($<10°$) the polarization dependent difference in the amount of redirected light is at most about 0.54 dB, this difference increases rapidly with increasing blaze angle, being about 2.86 dB and about 6.02 dB for blaze angles of 22° and 30°, respectively. Furthermore, as those skilled in the art will appreciate, the fraction of redirected light decreases with increasing blaze angle, for a given index change. See, for instance, T. Erdogan et al., *J. of the Optical Society of America-A*, Vol. 13(2), p. 296 (1996).

In view of the many important potential uses of an efficient, wavelength-selective fiber tap, it would be desirable to have available a fiber tap that is substantially free of the shortcomings of the above discussed prior art tap. This application discloses such a tap.

GLOSSARY AND DEFINITIONS

By "guided modes" we mean herein the propagating modes in the waveguide. The guided mode in a single mode conventional optical fiber is the $LP_{01}$ mode.

By "cladding modes", or "bound cladding modes" we mean herein optical modes of the waveguide structure that have an effective refractive index less than the refractive index of the cladding material of the waveguide. These modes are bound, in the sense that the optical power in these modes is always localized around the waveguide, and is not spreading out in a direction orthogonal to the propagation direction.

By "radiation modes" we mean herein optical modes that are not completely localized to the waveguide structure. Radiation modes spread away from the waveguide structure, such that at some point along the length of the waveguide there is an arbitrarily small amount of optical power located in the waveguide structure.

By a "non-guided mode" we mean herein a mode other than a guided mode, e.g., a cladding mode or a radiation mode.

A refractive index grating herein is "chirped" if the (optical) repeat distance $\Lambda$ of the index perturbations is not constant as a function of the axial coordinate z of the fiber, i.e., if $\Lambda=\Lambda(z)$.

A refractive index grating herein is "blazed" if the plane of the index perturbations in the waveguide is not perpendicular to the propagation direction of the guided mode or modes.

SUMMARY OF THE INVENTION

In a broad aspect the invention is embodied in an article (e.g., an optical waveguide communication system) that comprises an optical waveguide having a refractive index grating and coupling means selected such that at least a portion of the light is transferred from a guided mode into a radiation mode and is available for utilization by utilization means (e.g., a detector) outside of the waveguide and the coupling means.

More specifically, the invention is embodied in an article that comprises an optical waveguide for guiding light of wavelength $\lambda_i$ in at least one guided mode. The optical waveguide comprises a chirped and blazed refractive index grating selected such that at least a portion of the light in the guided mode is transferred into a non-guided mode. The article further comprises utilization means for utilizing the light in the non-guided mode.

Significantly, the article further comprises coupling means that are in optical cooperation with the waveguide such that said non-guided mode is a radiation mode. The grating has a blaze angle θ selected such that, in an otherwise identical comparison article that does not comprise said coupling means, the non-guided mode is a cladding mode. The grating furthermore has a chirp selected such that the light of wavelength $\lambda_i$ in the radiation mode is substantially brought to a focus in at least one dimension at a predetermined location outside said coupling means.

By way of explanation, the presence of the coupling means changes the waveguide properties in the vicinity of the grating such that the grating directs the light into a radiation mode or modes, rather than into a cladding mode or modes. This is typically accomplished by elimination of some or all of the cladding modes in the region of the index grating by physical means (designated the "coupling means") that will be described in detail below.

Although a waveguide tap according to the invention (i.e., a dispersive waveguide tap or DWT) can be advantageously used in a single wavelength optical waveguide system (e.g., to monitor the operating wavelength), such a tap will advantageously be used in a multiwavelength system, e.g., in a wavelength division multiplexed (WDM) optical fiber communication system.

BRIEF DESCRIPTION OF THE DRAWINGS

Same or analogous features in different figures will generally be designated by same numerals. The figures are not to scale.

DETAILED DESCRIPTION

Figure 1:
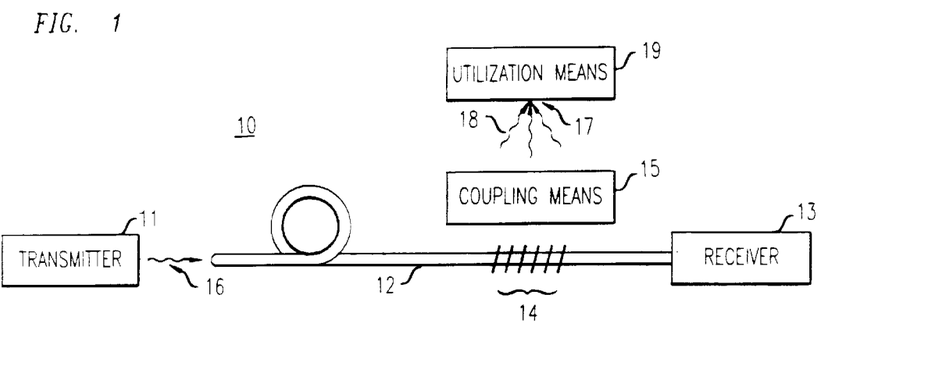
FIG. 1 schematically depicts an exemplary optical communication system according to the invention.

FIG. 1 schematically depicts an exemplary optical fiber communication system 10 according to the invention. Transmitter 11 provides signal radiation 16, exemplarily including light of wavelength $\lambda_i$. The signal radiation is coupled into conventional optical fiber 12 (typically a single mode fiber) in known fashion, and propagates in the fiber towards receiver 13. At an intermediate location in the fiber is provided blazed and chirped refractive index Bragg grating ("grating") 14. The grating is selected to direct, in optical co-operation with coupling means 15, guided mode light of a predetermined wavelength range (e.g., including $\lambda_i$) into a radiation mode or modes. For instance, light in $LP_{01}$ (the fundamental guided mode) is directed into radiation modes, as will be described in detail below. The coupling means, in co-operation with the fiber, not only ensure guided moderadiation mode conversion but also allow spatial dispersion, such that light of wavelength $\lambda_i$ is substantially brought to a focus at a predetermined point outside of the coupling means (and not located at the waveguide boundary), and light of wavelength $\lambda_j \neq \lambda_i$ is substantially brought to a focus in at least one dimension at a different point. In FIG. 1, numeral 18 refers to light of wavelength $\lambda_i$ that is being brought to a focus at point 17. Utilization means 19 are positioned at or near the focal point.

It should perhaps be emphasized that the grating is selected such that, in the absence of the coupling means, the grating directs radiation from a guided mode (exemplarily $LP_{01}$) into a cladding mode (or modes) of the waveguide. This can be readily verified by conventional means, as will be evident to those skilled in the art. It is the presence (and optical co-operation with the fiber) of the coupling means that locally changes the optical characteristics of the fiber such that the light is directed from the guided mode into a radiation mode (or modes).

Figure 2:
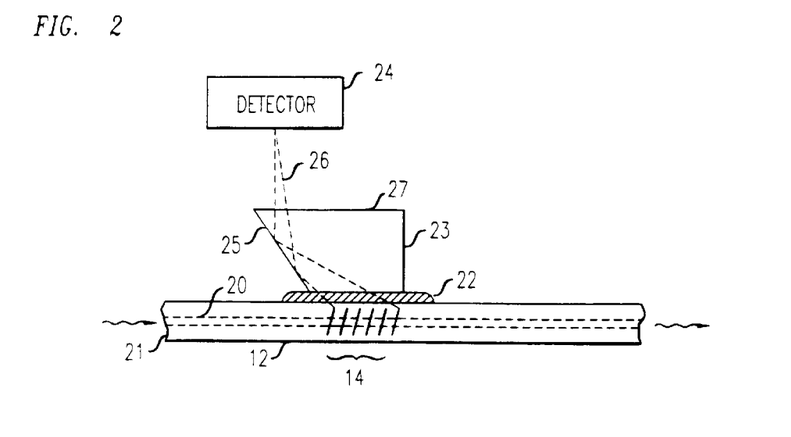
FIG. 2 shows schematically a relevant portion of an exemplary system including a blazed and chirped grating according to the invention.

FIG. 2 schematically shows an exemplary fiber tap according to the invention. Fiber 12 comprises a core 20 and a cladding 21. Grating 14 is formed in the core in conventional fashion. By way of example, the fiber was a conventional silica-based single mode fiber, and a grating was written into the fiber using a phase mask. The grating had a 9° tilt (blaze), a period $\Lambda(z)$ ranging linearly from 547.1 nm to 548.9 nm, and a Gaussian profile, with full width at half maximum (FWHM) of about 5 mm, corresponding to a linear chirp of about −3.6 nm/cm. Note that a negative chirp corresponds to decreasing grating period in the downstream direction.

Numeral 22 refers to an index matching medium, e.g., Cargill Oil, with refractive index chosen to be at or slightly above the refractive index of silica. Such matching eliminates the fiber cladding as a guiding structure, and allows the light that otherwise would have been directed into the cladding mode (or modes) by the grating to propagate at a low angle (e.g., $\leq 45°$) away from the fiber. Cargill Oil is not the only suitable index matching medium. For instance, index matched epoxy can be used to additionally bond member 23 to the fiber.

Member 23 exemplarily is a glass block configured such that the light of a given wavelength substantially comes to a focus (in at least one dimension) at a convenient point in space. For instance, face 25 of the glass block is inclined such that light beam 26 is redirected by total internal reflection, and exits from the block approximately normally to face 27. Note that non-normal incidence reduces backreflection into the waveguide. Detector 24 receives the light and provides a responsive electrical signal.

The arrangement of FIG. 2 is exemplary only, and many other arrangements are possible. For instance, a detector array could be disposed on face 25 of glass block 23, the array serving to receive spatially dispersed light of various wavelengths. By way of further example, optical fibers can be positioned to receive the spatially dispersed light, as those skilled in the art will recognize.

Figure 3:
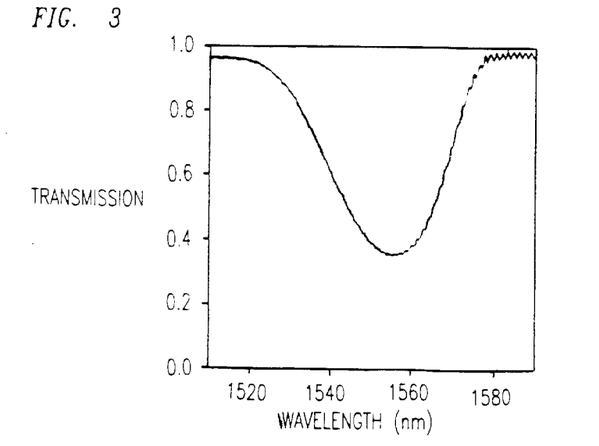
FIG. 3 shows an exemplary transmission spectrum.

FIG. 3 shows the transmission spectrum of a fiber DWT substantially as described above. The grating couples (in the absence of coupling means) about 50% of the single mode light in the 1540–1565 nm wavelength region to a cladding mode or modes.

The strength of the grating, and thus the fraction of the guided light that will be coupled out of the fiber in a given wavelength range, can be readily selected (for a given grating length, chirp and blaze angle) by appropriate choice of the amount of index perturbation in the grating. Whereas some applications may require strong gratings (e.g., 90% or even essentially 100%), other applications may require weak (e.g., ~10% or even less) or intermediate strength (e.g., 20–80%) gratings.

Figure 4:
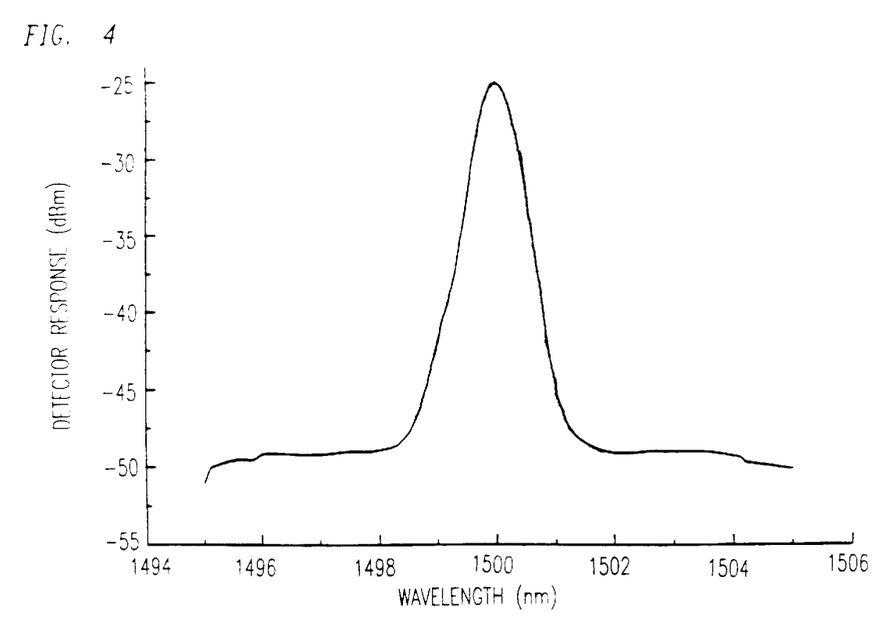
FIGS. 4 and 5 illustrate spatial dispersion of a DWT according to the invention, FIG. 6 schematically depicts relevant features of an exemplary DWT according to the invention, the tap embodied in planar waveguide technology.

FIG. 4 illustrates attainable spatial dispersion. The figure shows the output of a single detector 24 in an arrangement similar to that of FIG. 2. The grating spectrum was centered at about 1500 nm. As can be seen, a small wavelength band (e.g., less than 1.5 nm) can be readily isolated. Using a detector array, multiple wavelengths can be resolved and detected simultaneously over a relatively large bandwidth (e.g., 20–50 nm).

Figure 5:
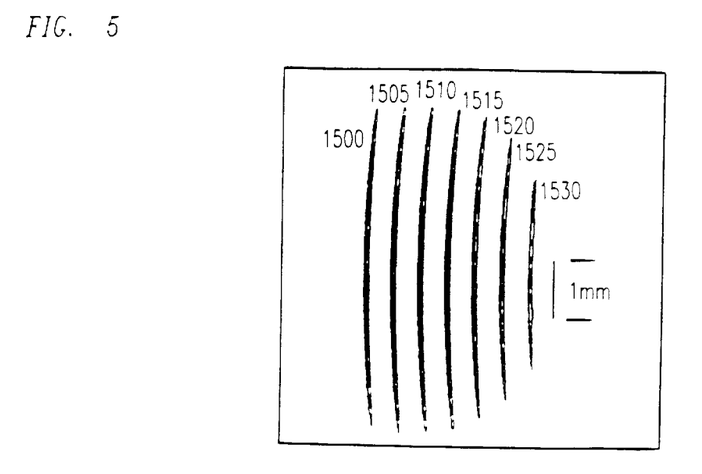

FIG. 5 also illustrates attainable spatial dispersion, by showing the different spatial locations at different wavelengths. The grating spectrum was centered at about 1515 nm. As can be seen, light is substantially brought to a line focus but could, if desired, be brought substantially to a point focus.

As disclosed above, in preferred embodiments of the invention the DWT is a blazed and chirped refractive index grating. The blaze serves to enhance the coupling from the guided mode to the cladding mode in the fiber (without coupling means present). The blaze angle typically is less than about 15°, with the choice of blaze angle depending on tolerable polarization dependence and desired mode coupling efficiency. The higher the blaze angle, the more polarization-dependent will be the grating characteristics. For example, a blaze of 8° shows less than 0.35 dB of polarization sensitivity in coupled power. On the other hand, for a given refractive index change, the coupling efficiency drops with increasing blaze angle. Consideration can also be given to the fact that azimuthal confinement of the light depends on blaze angle. For higher blaze angles, the azimuthal spreading of the coupled light is decreased (e.g., about 5° spread for a 9° blaze angle). This is desirable to increase the fraction of the coupled light that reaches the utilization means.

The chirp of the grating serves to provide spatial dispersion of the light coupled from the fiber. Although the optimal chirp for any given wavelength can be determined by Bragg diffraction theory, a linear chirp frequently provides a good approximation to the optimal chirp. The magnitude of the chirp determines the focal distance, with the focal distance decreasing with increasing chirp. For example, for a 2 mm long grating with a starting period of 533 nm and a blaze of 8 degrees, the focal distance for 1550 nm light is about 1 cm with a −5 nm/cm grating chirp. As the chirp is increased to −10 nm/cm the focal length drops to about 0.5 cm, and conversely if the chirp is decreased to −2.5 nm/cm, the focal length increases to about 2 cm.

For a given length of grating, the larger the focal length, the better a linear chirp approximates the optimum chirp. It is therefore desirable not to have a grating with an excessively large chirp, which may yield optimal characteristics for one wavelength but may not even be close to optimum for another. Chirps of less than 10 nm/cm are desirable to yield good spectral resolution. In the above described grating, a chirp of −10 nm/cm can yield a 1 nm possible spectral resolution, while the −5 nm/cm chirp can give 0.25 nm possible resolution, and the −2.5 nm/cm chirp can give sub-angstrom resolution.

The detected resolution also depends on the effective width of the line focus and the spatial separation of different wavelengths. FIG. 5 shows the spatial separation of wavelengths spaced 5 nm apart in the 1500 to 1530 nm range. It also shows the finite width (spot size) of the line focus at any particular wavelength. The product of the line focus width and the wavelength spacing per unit length gives a lower bound on the obtainable resolution with any detector slit size (e.g., about 1 nm for wavelengths depicted in FIG. 5). The grating blaze angle and the location of the utilization means predominately determine the wavelength spacing per unit length, with the spacing growing as the utilization means are located further from the grating. The length of the index grating along with the chirp rate determine the width of the line focus, thereby determining the expected best resolution.

In the cases of relatively low chirp, the actual detected resolution typically will not be limited by the chirp function, but instead by the grating length and strength, the grating apodization, and the effective detection slit width. The lower limit on the chirp rate typically is determined by the longest practical focal length, and is exemplarily on the order of 0.5 nm/cm.

A grating can be written in a planar waveguide as well as in optical fiber (not necessarily limited to conventional circularly symmetric optical fiber. For instance, fibers having at least one planar surface, e.g., a fiber with "D" cross section, or a fiber with substantially square cross section are contemplated), as will be recognized by those skilled in the art. Indeed, the invention can be embodied in planar waveguides, by appropriate adaptation of the above disclosed structures and techniques. As in optical fiber, it is advantageous to provide a planar waveguide having a relatively small number of cladding modes. Exemplarily, a tap according to the invention can be embodied in a structure 60 as depicted schematically in FIG. 6.

Figure 6:
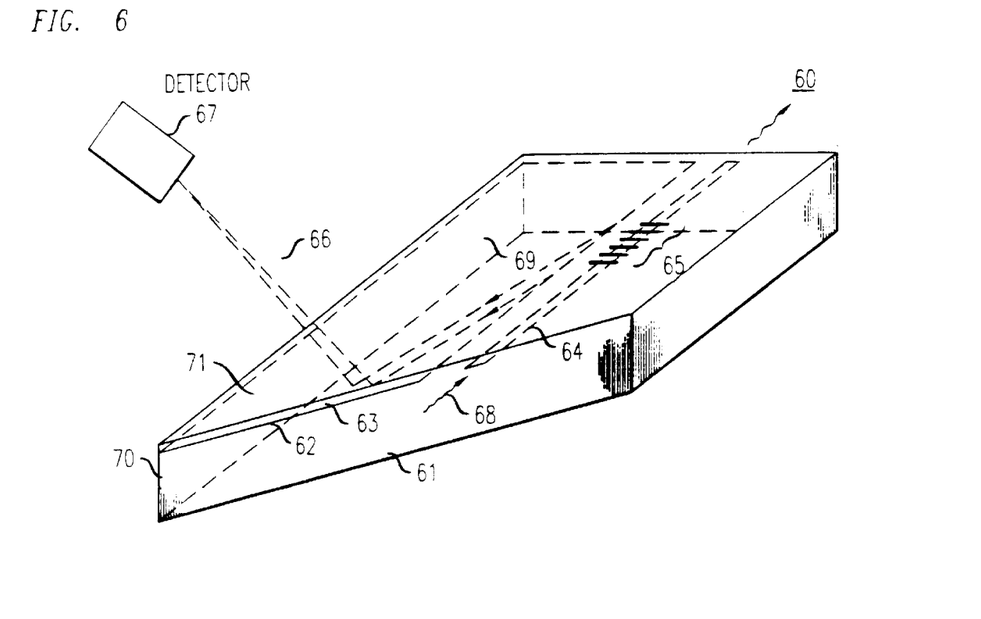

In FIG. 6, numeral 61 refers to a substrate body, exemplarily a portion of a Si wafer. Numeral 62 indicates a planar waveguide layer, exemplarily comprising an $SiO_2$ lower cladding layer, a phosphosilicate core layer disposed on the lower cladding layer, and a boro-phospho-silicate upper cladding layer. Such planar waveguide structures are well known and do not require elaboration. The waveguide layer is patterned (e.g., by conventional photolithography) to provide conventional planar (linear) waveguide 64 and two-dimensional planar waveguide 69. The two guides (64 and 69) are spaced apart but are close enough to provide optical cooperation between the guides in the grating region 65. On the patterned waveguide layer optional cover layer 63 (e.g., B- and P-doped $SiO_2$) can be disposed. In the core of a portion of linear waveguide 64 is formed blazed and chirped refractive index grating 65 by UV exposure. The core of linear waveguide 64 exemplarily is selected such that the waveguide is a single mode waveguide for radiation 68 of the desired wavelength. The radiation is coupled into the linear waveguide by conventional means, propagates to the grating where at least some of the radiation is directed into a non-guided mode or modes. Due to the cooperation between the linear waveguide 64 and the 2-dimensional planar waveguide 69, cladding modes of the linear waveguide 64 are substantially eliminated in the vicinity of the grating, and the light is directed into a radiation mode or modes, and propagates in the 2-dimensional planar waveguide towards angled surface 70, where the light is reflected toward surface 71 and utilization means 67.

As will be evident from the above description, the 2-dimensional planar waveguide 69 functions as the coupling means, and the embodiment of FIG. 6 is functionally equivalent to the embodiment of FIG. 2. The 2-dimensional planar waveguide confines the light in the direction normal to the waveguide layer, but does not provide guiding in the plane of the waveguide.

Figure 7:
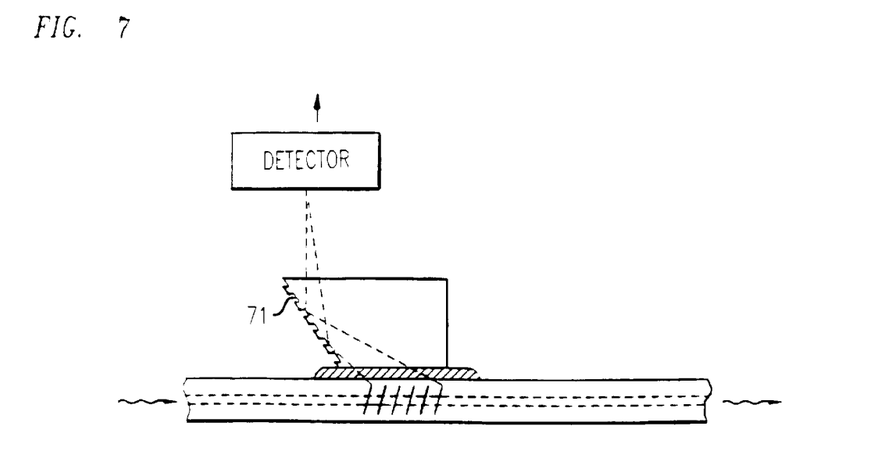
FIG. 7 schematically depicts a further embodiment of a DWT according to the invention.

The above described embodiments are exemplary only, and variations of the basic scheme can be devised. For instance, provision of an additional dispersive element can result in improved spectral resolution of the DWT. Exemplarily the dispersive element is a grating provided on a surface of the coupling means, as is schematically indicated in FIG. 7 (wherein numeral 71 refers to the grating), or is a volume grating (e.g., a hologram) in the coupling means. Other arrangements are possible. For instance, a conventional prism can be placed into the beam path, e.g., be disposed on surface 27 of FIG. 2.

FIG. 7 (and FIG. 2) shows only a single wavelength tapped from the fiber and received by the detector. This is for reason of clarity only, and it will be understood that generally a multiplicity of wavelengths will be tapped from the fiber by a DWT and will be received by a multiplicity of detectors (or optical waveguides).

Figure 8:
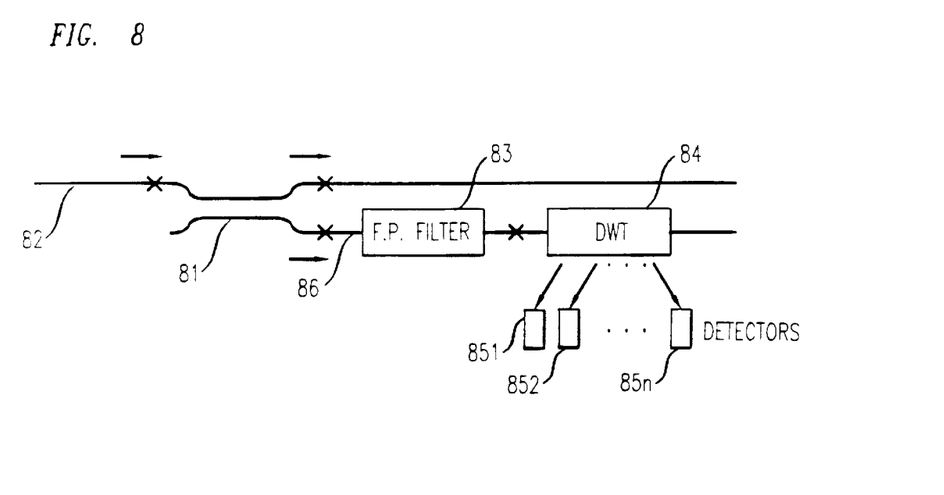
FIG. 8 schematically depicts a relevant portion of an exemplary optical communication system according to the invention.

In a further embodiment, a filter (e.g., a fiber Fabry-Perot filter or a conventional bulk Fabry-Perot) is disposed just upstream of a DWT, as is shown schematically in FIG. 8, wherein an optional conventional coupler 81 couples a small fraction (e.g., 5%) of multichannel signal power from fiber 82. The coupled-out light propagates through fiber 86 to Fabry-Perot filter 83. The filter is selected to have very narrow transmission bands centered at $\lambda_1, \lambda_2, \ldots \lambda_n$. Light of these wavelengths thus passes through the filter and propagates to DWT 84 where the spectrum is spatially dispersed and detected by detectors 851, 852 . . . 85n. The combination of FIG. 8 is advantageously used in a WDM optical communication system comprising a feedback loop for locking the WDM transmitter (not shown) to the correct wavelengths ($\lambda_1, \lambda_2, \ldots \lambda_n$) and channel power pre-emphasis. Such a feedback loop needs to exhibit high spectral resolution (typically <0.1 nm). Such resolution is readily attainable by means of a filter/DWT combination according to FIG. 8. Of course, DWT 84 could be a tap of the kind shown in FIG. 7, to provide increased spatial separation of the various wavelengths.

It will be understood that "dispersive waveguide taps or "DWTs" are devices that can remove light from a waveguide and spectrally disperse the removed light such that light of different wavelengths is available for utilization (e.g., detection) at different respective locations in space. The above described tap according to the invention is an exemplary and advantageous embodiment of a DWT.

DWTs can advantageously be used in multichannel WDM communication systems, as will be exemplified below. The DWTs exemplarily are used to perform functions that, if performed at all in prior art systems, were performed by more expensive and/or less effective means.

In the prior art, conventional (non-dispersive) fiber taps were employed in single channel systems for e.g., detection of the presence or absence of the channel, for adjustment of an optical amplifier's pump power to maintain the same operation point (compression) for widely varying input powers. The prior art also contains WDM systems that use conventional (non-dispersive) fiber taps. These systems use "tones" (i.e., low frequency amplitude or frequency variations of the signal power of the various channels) to identify the fraction of each wavelength contributing to the total power.

This approach however has shortcomings. For instance, placement of tones on information signals frequently leads to degradation of transmission quality, and the presence of tones can lead to crosstalk, possibly resulting in false readings of channel presence and/or power. Use of DWTs can not only overcome prior art shortcomings but can inexpensively and simply provide novel system functions, typically feedback functions that facilitate system management.

Figure 9:
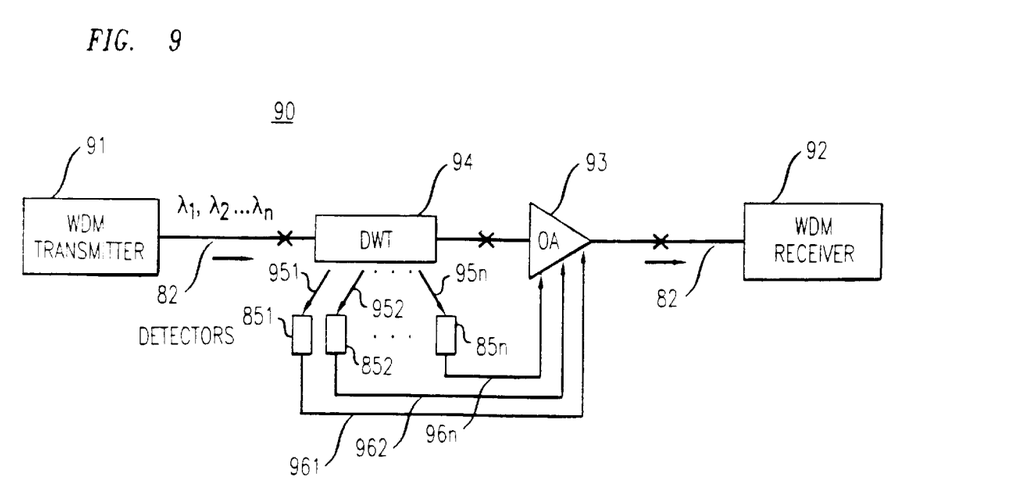
FIGS. 9–11 schematically depict exemplary communication systems that utilize DWTs.

FIG. 9 schematically shows an exemplary optical fiber communication system 90 with feedback control of optical amplifier 93. The system comprises WDM transmitter 91, WDM receiver 92, and an optical fiber transmission path signal-transmissively connecting transmitter and receiver. The transmission path comprises conventional transmission fiber 82, a DWT that couples a predetermined small fraction (e.g., 5%) of the signal power from the transmission path, and conventional optical amplifier (e.g., EDFA) 93. The signal radiation comprises n channels of wavelength $\lambda_1$, $\lambda_2$, ... $\lambda_n$. DWT 94 disperses the coupled-out signal power into n optical beams 951–95n, means of conventional detectors 851 ... 85n, respectively, and the resulting electrical signals 961 ... 96n are fed to control apparatus of the optical amplifier 93, where they are utilized in conventional fashion to adjust one or more operational characteristics of the amplifier, e.g., pump power (and potentially gain shape), to attain or maintain desired systems characteristics, e.g., to enable the optical amplifier to maintain constant output conditions for all active channels, even if the input level or number of channels unexpectedly changes. It will be appreciated that an optical amplifier with control apparatus, DWT, detectors and electrical connections can be provided in a single unit, and such units are contemplated.

Figure 10:
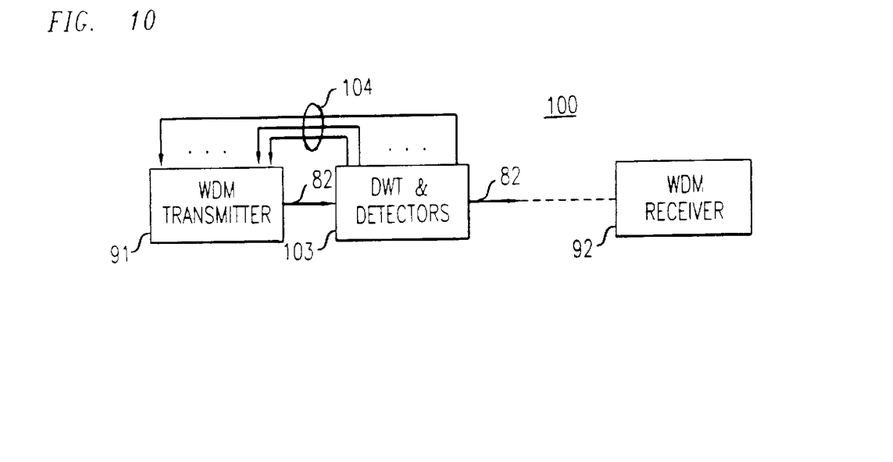

FIG. 10 schematically depicts another exemplary optical fiber WDM communication system with feedback control. The system comprises n-channel WDM transmitter 91, WDM receiver 92, fiber path 82, and DWT (with detectors) 103. The transmitter can contain discrete radiation sources (typically lasers) or one or more multiwavelength sources (typically also lasers). In either case, electrical outputs 104 of the detectors are fed to the transmitter, where they are utilized to maintain the n channels aligned with respect to, e.g., wavelength and/or power. Such alignment can be achieved in conventional fashion using feedback. For instance, wavelength is maintained by means of temperature control, and power is maintained by means of drive current control.

Figure 11:
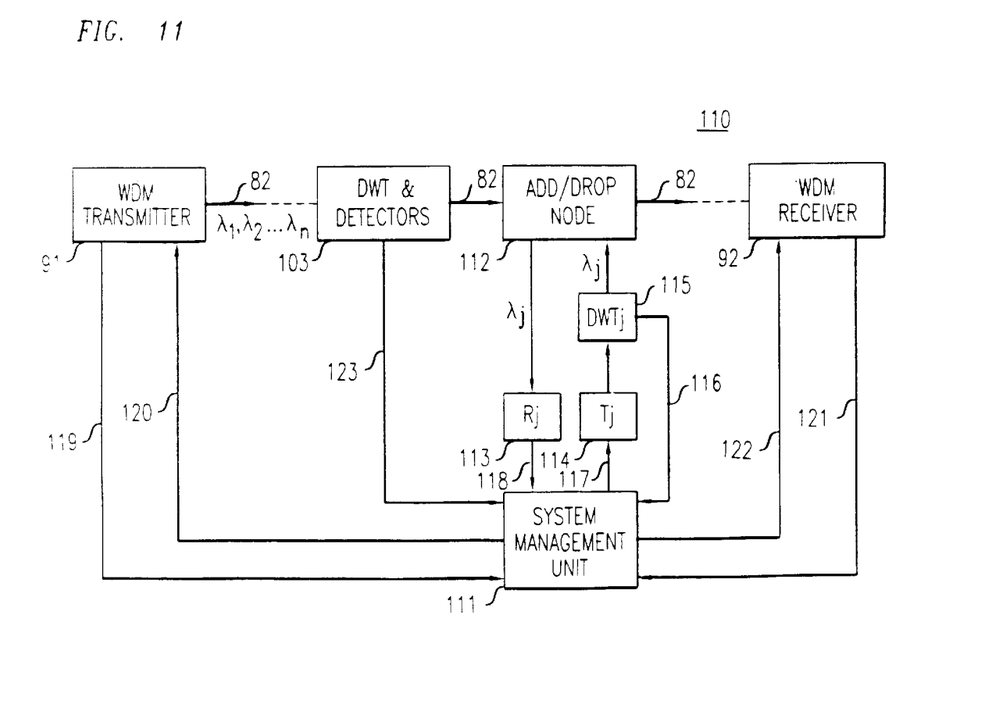

FIG. 11 schematically depicts a further exemplary WDM optical fiber communication system with feedback control. It will be understood that actual WDM systems will typically comprise a multiplicity of add/drop nodes 112, spaced along the transmission path, and serving to remove one or more channels (e.g., $\lambda_j$) from the transmission path, and to add one or more channels (e.g., $\lambda_j$).

The WDM transmitter provides n channels, exemplarily as shown in FIG. 10. DWT (and detectors) 103 extracts information (e.g., which channels are present at what power, wavelength of each channel) from the multiplexed optical signal that arrives at DWT 103, and provides corresponding electrical signals to system management unit (SMU) 111. The optical WDM signal then is provided to add/drop node 112, where channel $\lambda_j$ is dropped and new channel $\lambda_j$ is added, both in conventional fashion. The dropped channel is detected in drop channel receiver 113. Electrical signal 118 is provided to SMU 111. Add channel transmitter 114 provides optical channel $\lambda_j$ to add channel DWT 115 (or other suitable tap; e.g., a prior art single wavelength tap), with the DWT providing electrical signal 116 to the SMU, which in turn provides electrical control signal 117 to transmitter 114. Optical channel $\lambda_j$ is provided to add/drop node 112 and is added to the WDM signal stream propagating towards WDM receiver 92. Both WDM transmitter 91 and WDM receiver 92 are under the control of SMU 111, as indicated by electrical signals 119 and 120, and 121 and 122, respectively.

It will be understood that the SMU is not necessarily a single discrete unit but can (and frequently will) be distributed. It will also be understood that the system of FIG. 11 is exemplary only, and that many variations are possible. For instance, one or more of the detectors of a given DWT, could be detectors of a receiver. However, in common with the examples presented above, WDM optical fiber communication systems according to the invention utilize DWTs to provide signals that are representative of channel wavelength(s), and/or channel power(s) including presence or absence of power in a channel, and that facilitate system management by means of a variety of feedback loops. Feedback loops per se are of course well known and those skilled in the art will be readily able to implement feedback loops that provide specific functions and utilize DWTs. We believe that such WDM systems will be substantially free of the above described shortcomings of prior art WDM systems that utilize tones to convey the control information. We also believe that this technical advance is attainable at relatively modest cost, due to the relative simplicity and low cost of DWTs associated detectors.

EXAMPLE

Conventional 5D® single mode silica-based fiber, with germanium-doped core, was deuterium-loaded in conventional fashion, and exposed to 242 nm laser radiation through a phase mask to form a blazed and chirped Bragg grating in the fiber. The fiber was tilted 9 degrees with respect to the phase mask, i.e., the blaze angle was 9. The phase mask had a center period of 1.114 μm, with a chirp of −2.47 nm/cm. The UV intensity was Gaussian along the length of the fiber, with full width at half maximum of 1 cm. The grating growth was monitored in conventional fashion, and the exposure was stopped when the desired grating depth was reached. After annealing the fiber with the grating therein at 140° C. for 12 hours, the grating coupled about 15% of light from the guided mode to a non-guided mode or modes (primarily cladding modes), for light in a 55 nm range centered at 1545 nm. It is verified that, with the fiber in air and no object within coupling distance of the fiber in the grating region, the grating couples a negligible amount of the guided mode power into a radiation mode or modes.

A 3 cm×1cm×0.1 cm silica slab was used as the coupling means. One short side of the slab was cut and polished at a 124° included angle with one of the long sides of the slab, and that long side was polished. The bare fiber was then epoxy bonded to the polished long side such that the fiber was positioned along the center of the 3 cm×0.1 cm side, with the grating centered along the length of the side, and with the blaze of the grating pointing into the slab. This is achieved by maximizing, before the epoxy cures, the amount of 1545 nm light that is coupled from the fiber into the slab. The epoxy was conventional epoxy, with refractive index at 1550 nm matched to that of silica. The fiber was disposed such that the grating period increased in the direction from the squared off end of the slab to the angled end thereof. After curing of the epoxy the bare fiber and the epoxy bond were coated with a conventional polymer fiber coating.

A detector array was disposed 20 cm from the fiber, facing the fiber and parallel thereto. The array consisted of 512 InGaAs conventional detection elements, with 50 μm center spacing. Each element was 30 μm wide and 500 μm long. The array covered about 40 nm of optical bandwidth, with just under a 0.1 nm spacing between the center wavelengths of adjacent elements. When light was propagated in the fiber direction from the longer grating period to the shorter grating period, the power at each element was recorded sequentially in time and related to the center wavelength detector by the respective elements. Thus the optical power spectrum of the light was determined. This established functioning of the DWT as intended.

The invention claimed is:

1. In a multichannel wavelength division multiplexed optical fiber communication system comprising a transmitter, a receiver, and optical fiber signal transmissively connecting said transmitter and receiver and comprising a dispersive waveguide tap adapted for providing an output representative of channel wavelength and channel power of each of a multiplicity of said wavelength division multiplexed channels, said output being provided to utilization means that comprise feedback means for maintaining said channel wavelength and channel power of each channel of the multiplicity of channels at a predetermined value.

2. An article comprising a dispersive waveguide tap, an optical amplifier connected to the dispersive waveguide tap by optical waveguide means, a multiplicity of detectors, each having an optical input provided by the dispersive waveguide tap and an electrical output, and optical amplifier control apparatus that receives the respective electrical outputs of the detectors and changes an operational characteristic of the optical amplifier in response to said received electrical outputs; wherein said dispersive waveguide tap receives wavelength division multiplexed light including light of wavelengths $\lambda_1, \lambda_2, \ldots \lambda_n$ where n is an integer greater than 1, provides a predetermined fraction of the received light of each of said wavelengths $\lambda_1, \lambda_2, \ldots \lambda_n$ to a respective predetermined one of said detectors.

3. A multichannel wavelength division multiplexed optical fiber communication system comprising a transmitter, one or more receivers, and optical fiber signal transmissively connecting said transmitter and receivers and comprising a dispersive waveguide tap; wherein the dispersive waveguide tap receives signal light of wavelengths $\lambda_1, \lambda_2, \ldots \lambda_n$, where n is an integer greater than 1, and provides a predetermined fraction of the signal light of one or more of said wavelengths to one or more detectors, respectively; wherein at least one of said receivers comprises one of said detectors.

* * * * *